(12) United States Patent
Li et al.

(10) Patent No.: US 10,540,085 B2
(45) Date of Patent: Jan. 21, 2020

(54) MICROPHONE CONTROL VIA CONTACT PATCH

(71) Applicant: Lenovo (Singapore) Pte. Ltd., Singapore (SG)

(72) Inventors: Scott Wentao Li, Cary, NC (US); Timothy Winthrop Kingsbury, Cary, NC (US); Robert James Kapinos, Durham, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 27 days.

(21) Appl. No.: 15/180,875

(22) Filed: Jun. 13, 2016

(65) Prior Publication Data
US 2017/0357360 A1 Dec. 14, 2017

(51) Int. Cl.
*G06F 3/048* (2013.01)
*G06F 3/0488* (2013.01)
*H04R 3/00* (2006.01)

(52) U.S. Cl.
CPC ............ *G06F 3/0488* (2013.01); *H04R 3/00* (2013.01); *H04R 2499/11* (2013.01)

(58) Field of Classification Search
CPC ...... G06F 3/0416; G06F 3/016; G06F 3/0488; H04R 3/00; H04R 2499/11
See application file for complete search history.

(56) References Cited

U.S. PATENT DOCUMENTS

| | | | |
|---|---|---|---|
| 6,681,020 B1* | 1/2004 | Papopoulos | H04R 3/00 381/111 |
| 2006/0097991 A1* | 5/2006 | Hotelling | G06F 3/0416 345/173 |
| 2007/0075965 A1* | 4/2007 | Huppi | H04M 1/72563 345/156 |
| 2010/0321321 A1* | 12/2010 | Shenfield | G06F 1/3215 345/173 |
| 2014/0085220 A1* | 3/2014 | Gossweiler, III | G06F 3/0488 345/173 |
| 2015/0156308 A1* | 6/2015 | Jang | H04M 1/656 455/411 |
| 2016/0132285 A1* | 5/2016 | Hawker | G06F 3/04883 345/173 |

* cited by examiner

*Primary Examiner* — Liliana Cerullo
(74) *Attorney, Agent, or Firm* — Ference & Associates LLC

(57) ABSTRACT

One embodiment provides a method, including: detecting, using a touch surface, facial contact of a user with an electronic device; determining, based on the facial contact of the user, a position of the electronic device relative to user's face; and toggling, based on the identified position, a characteristic of the electronic device. Other aspects are described and claimed.

19 Claims, 5 Drawing Sheets

MICROPHONE CONTROL VIA CONTACT PATCH

BACKGROUND

Information handling devices (e.g., tablets, smartphones, smart watches, etc.) are integral to most individual's way of life. These devices connect us with the outside world and can be the primary means of communication with others. Although there are many advantages to these devices, they are constantly being changed and updated to meet the needs of the user. Mobile phones are no longer simply one to one communication devices. Advancements in software now allow smart devices to manage multiple connections between multiple users and multiple devices.

However, because mobile phones were not directly designed to deal with large group communication (e.g., a conference call) the user experience may not be as polished as most business clients would like. For example, if a large number of people are on the conference call, the sensitive microphone in their mobile devices may create a large amount of ambient noise. Typically phones designed for conference calling have the ability to reduce this background noise that a smaller multi-functional smartphone may lack. Conventionally this issue can be solved via muting the device, but this causes problems if an individual needs to participate in the conversation and can be burdensome.

BRIEF SUMMARY

In summary, one aspect provides a method comprising: detecting, using a touch surface, facial contact of a user with an electronic device; determining, based on the facial contact of the user, a position of the electronic device relative to user's face; and toggling, based on the identified position, a characteristic of the electronic device.

Another aspect provides an information handling device, comprising: a touch surface; a processor; a memory device that stores instructions executable by the processor to: detect, using the touch surface, facial contact of a user with an electronic device; determine, based on the facial contact of the user, a position of the electronic device relative to user's face; and toggle, based on the identified position, a characteristic of the electronic device.

A further aspect provides a product, comprising: a storage device having code stored therewith, the code being executable by the processor and comprising: code that detects, using a touch surface, facial contact of a user with an electronic device; code that determines, based on the facial contact of the user, a position of the electronic device relative to user's face; and code that toggles, based on the identified position, a characteristic of the electronic device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
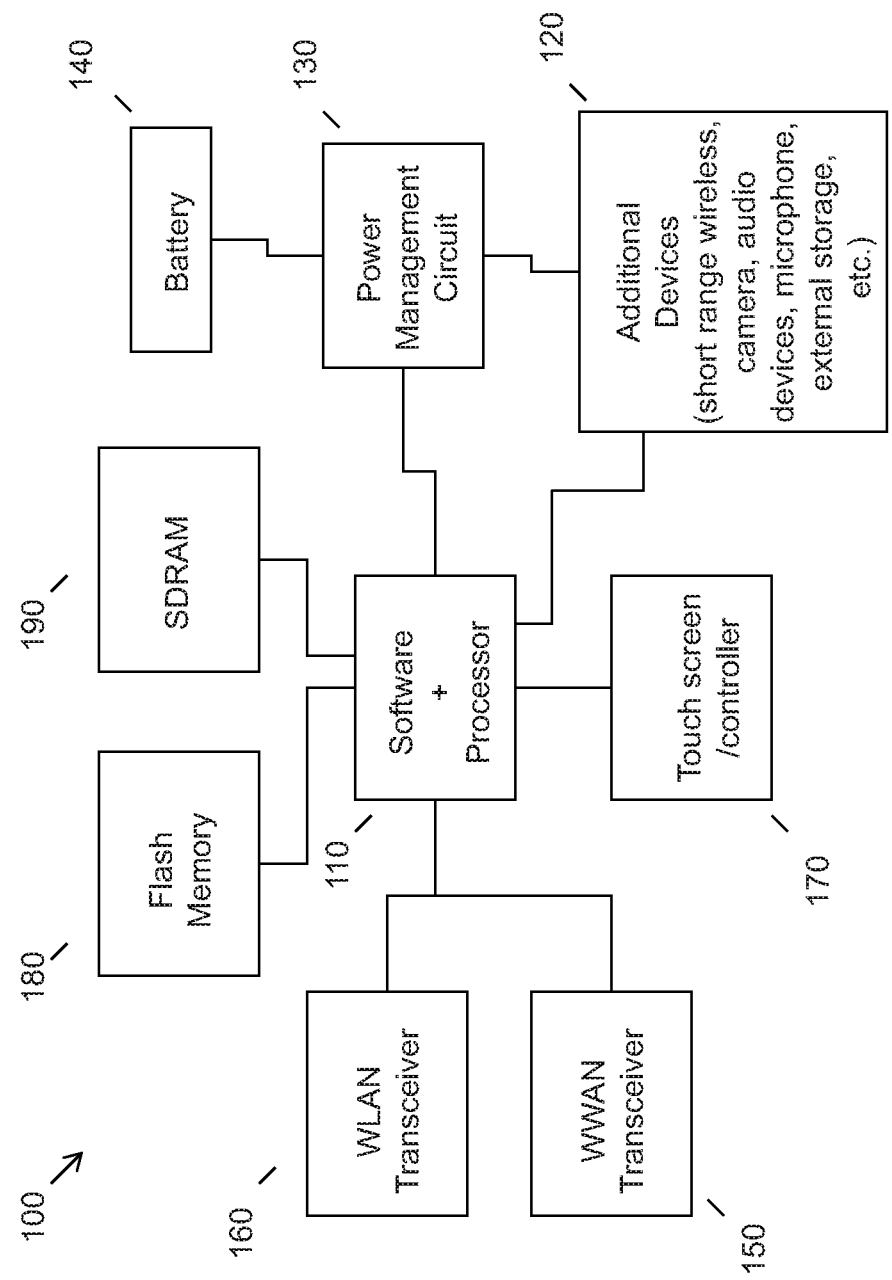
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As discussed herein, it can be difficult to conduct a large group conference call using mobile devices. Users often need to toggle mute on and off in noisy environments (e.g., when on conference calls) specifically when using a smartphone or device without a headset. Currently most smartphones can be muted, but the user must physically interact with the device (e.g., pressing the mute toggle switch via an onscreen graphical user interface (GUI)). However, this solution can be inconvenient and burdensome to the end user as they have to constantly move the phone away from their ear, wait for the screen to activate, scramble to find the mute/unmute toggle, and move the phone back into its proper position. This overly involved action can create a long pause in the conversation which may interrupt the flow of discussion or cause a user to miss important parts of conversation.

Accordingly, an embodiment utilizes a touchscreen (e.g., capacitive, resistive, acoustic wave, etc.) on an electronic device (e.g., a smartphone) as a low resolution but large area image sensor. The touch screen may then reliably detect and identify a user's facial contact area with the device. Using the captured facial image, the phone may then act as an action trigger for some predetermined action (e.g., muting/unmuting the device, turning the screen of the device on/off, disabling/enabling audio on the device, etc.).

By way of non-limiting example, if a user were to press a smartphone against his or her cheek, the touch screen of the smartphone would be able to register an ear and potentially a cheek contact patch image. Using this image, an embodiment may be able to determine the general position of the smartphone. In one embodiment, the position may be based on the contact area exceeding a predetermined threshold (e.g., a certain percentage of the cheek/ear area is visible. If it is determined that the threshold is met, it could then be determined that the user intends to utilize the device, and thus an action could be taken (e.g., unmute the phone).

Accordingly, an embodiment provides a method of detecting facial contact of a user on a touch surface. Based on the detected contact, an embodiment generates an image (e.g., showing a user's ear and/or cheek area). An embodiment may then determine if the contact area exceeds a predetermined threshold, and based on that determination, toggle a characteristic of the electronic device.

The illustrated example embodiments will be best understood by reference to the figures. The following description is intended only by way of example, and simply illustrates certain example embodiments.

While various other circuits, circuitry or components may be utilized in information handling devices, with regard to smartphone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., audio devices such as a microphone, a speaker, and the like. System 100 often includes a touch screen 170 for data input and display/rendering. System 100 also typically includes various memory devices, for example flash memory 180 and SDRAM 190.

Figure 2:
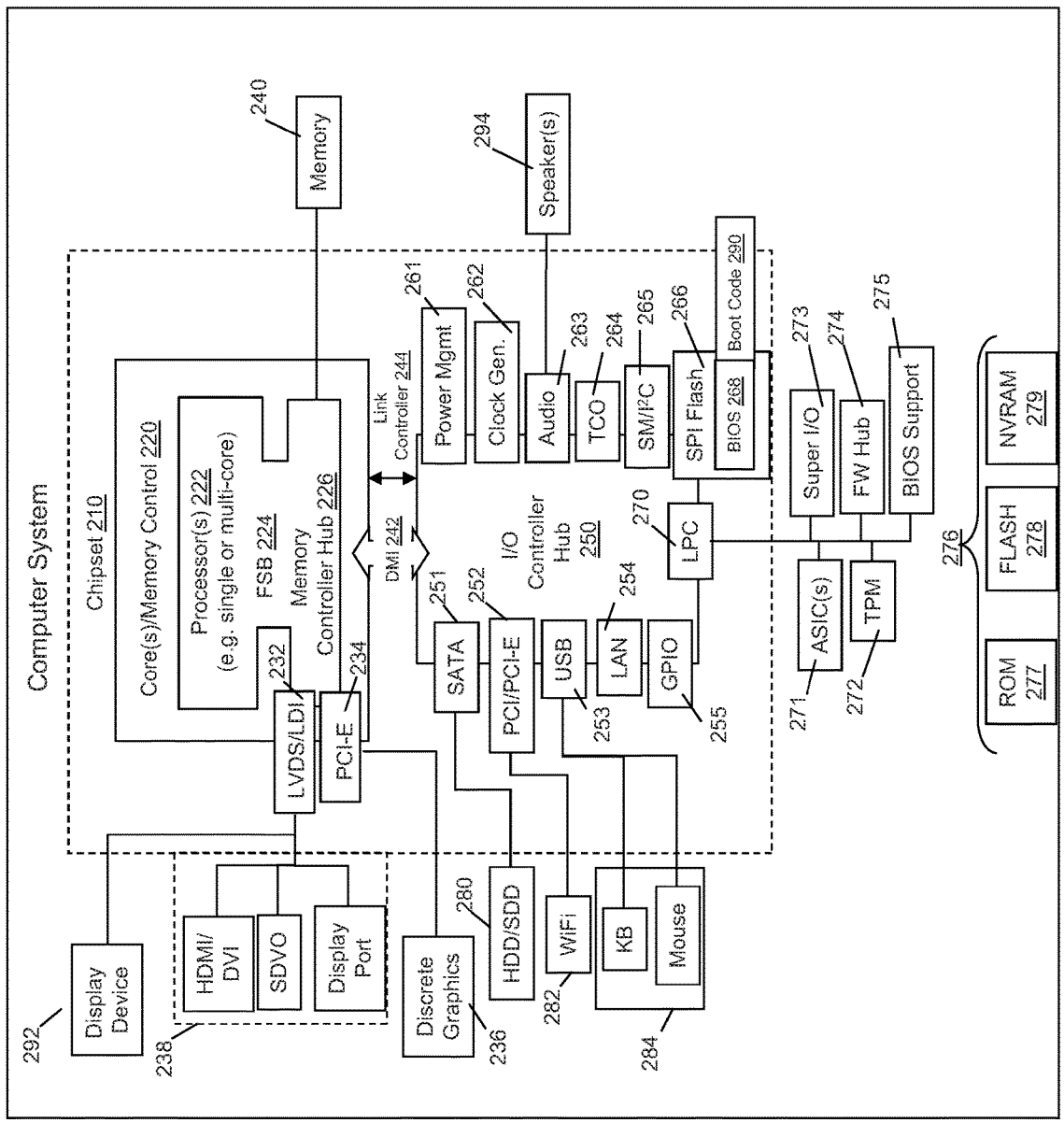
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smartphones, personal computer devices generally, and/or electronic devices which users may use for communicating with others (e.g., in a group conference call). For example, the circuitry outlined in FIG. 1 may be implemented in a tablet or smartphone embodiment, whereas the circuitry outlined in FIG. 2 may be implemented in a personal computer with which a handheld mobile device interacts.

Figure 3:
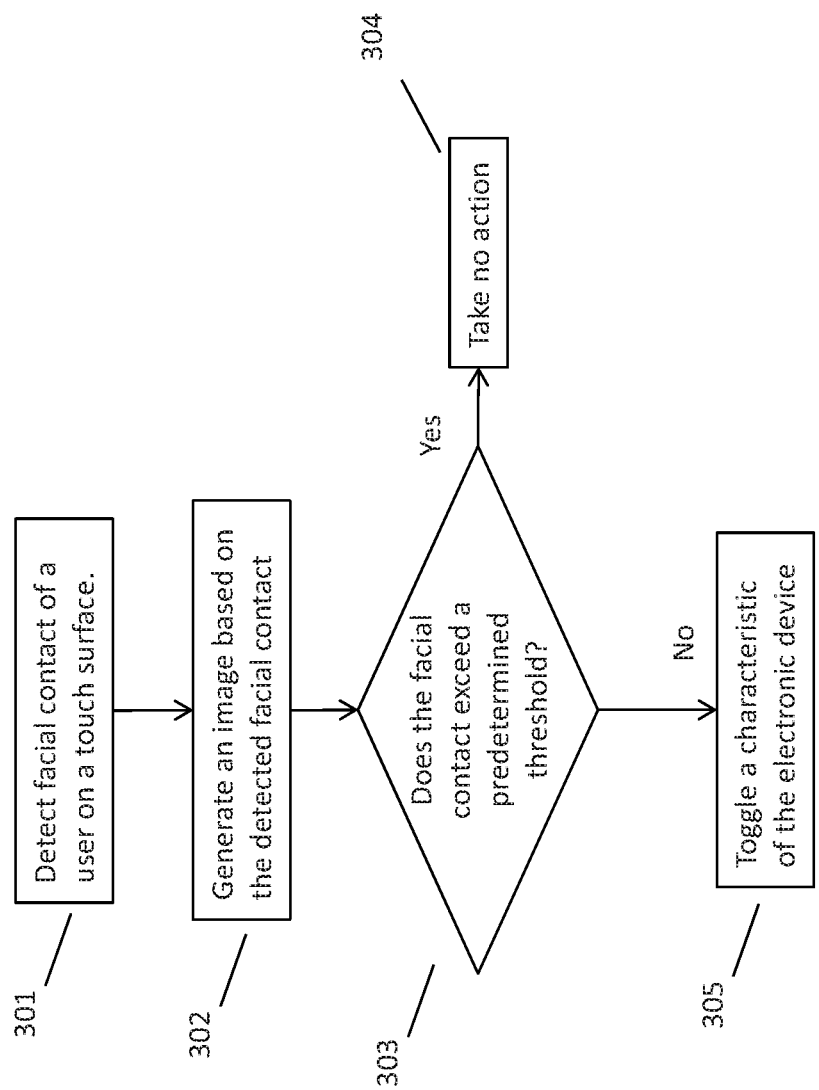
FIG. 3 illustrates an example method of microphone control via contact patch.

Referring now to FIG. 3, an embodiment may detect facial contact of a user with a touch surface at 301. For example, a user may be holding their smartphone against their head in order to listen to the audio coming out of the speaker (e.g., a user on the other end of a phone call). Due to the use of touch screens, smartphones have increased in size dramatically over the last few years. Because of this increase in size, when a user holds their phone up to their ear, the phone generally touches a large portion of the side of the user's face. Thus, most touch surfaces, specifically those that accept multiple touch input are able to detect the various points of interaction with a user's face.

Figure 4:
FIG. 4 shows an example generated facial contact image
Figure 5:
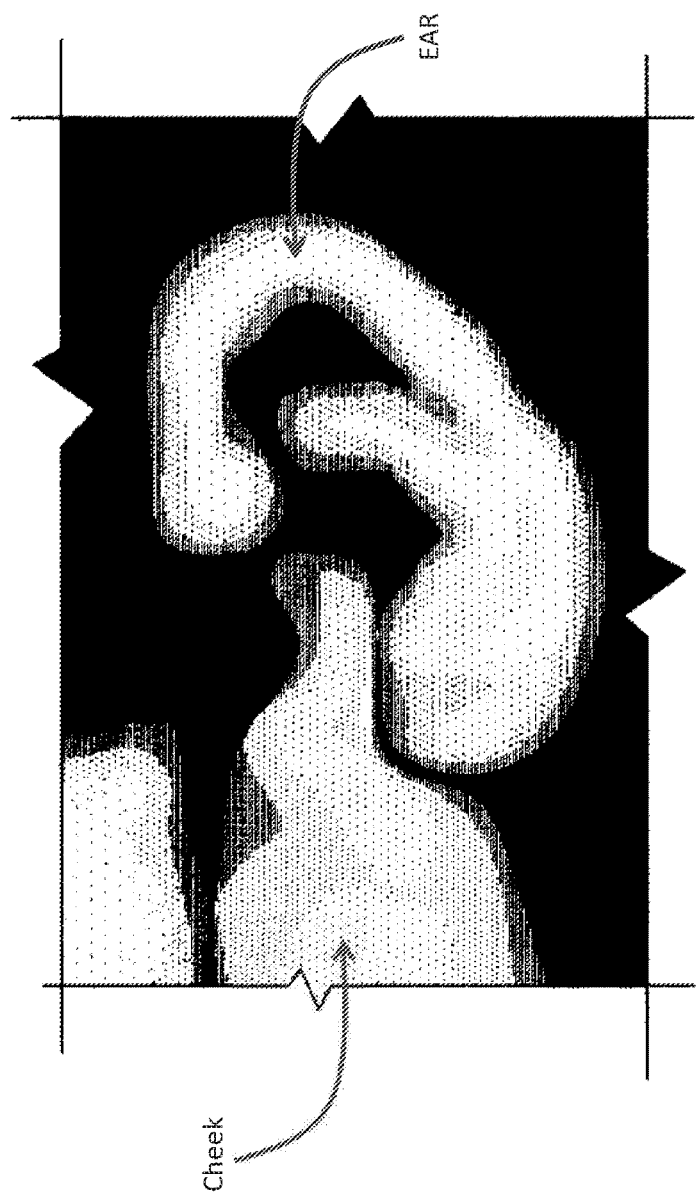
FIG. 5 shows another example generated facial contact image.

Using the facial detection from the touch surface (e.g., touch screen) an embodiment may generate an image representing the current user touch pattern at 302. For example, FIG. 4 shows an example of an image generated where only a user's ear is presently in contact with the touch surface. Alternatively, FIG. 5 shows an example of an image generated when both a user's ear and cheek are in contact with the touch surface. In one embodiment, the generated image may be generated continuously or at various predetermined intervals, e.g., once every few seconds while a voice call is in progress. Additionally or alternatively an embodiment may generate the image based on an additional trigger.

For example, in one embodiment, the additional trigger may be detected movement of the device (e.g., using an accelerometer, gyroscope, etc.). Thus, if a user moves their device while a voice call is active, an embodiment may assume that the movement changed the device's position relative to the user's face (e.g., the user pulled the phone away from their head). In a further embodiment, the additional trigger may be the detection of an application opening or closing. An embodiment detects if the device is connected to one or more other electronic devices (e.g., a phone call or conference call). Thus, an embodiment may monitor for changes in the user's connection to others (e.g., if someone leaves the conference call) and utilize that information to trigger the touch surface to capture an image, alter capture rate, etc.

As is shown in FIG. 4 and FIG. 5, an embodiment may detect a user's ear and/or cheek in the process of generating the image. It should be understood, that these are non-limiting examples of a generated image, and that any shape may be captured via the touch surface of the device (e.g., a user's chin, jawline, nose, etc.). Based on the generated image, an embodiment can determined how close or in what position the user is holding a device, e.g., via comparison to a predetermined set of images and associated rules corresponding to image detection.

In one embodiment, the generated image may be compared to a previously generated image in order to detect a change in the device location relevant to the user. By way of non-limiting example, if a user was in close contact with their device (e.g., both ear and cheek present) such as that shown in FIG. 5, the device may infer that the user is engaged in the conversation (e.g., actively speaking) and thus have a microphone active. However, if a later generated image shows less contact, such as that shown in FIG. 4, an embodiment may infer that the user has moved the device away from their face and is thus no longer engaged in the conversation Another embodiment may determine if the facial contact exceeds a predetermined threshold (e.g., are both an ear and cheek present in the image) at 303. Continuing from the previous non-limiting example, if the originally generated image showed a lot of contact (e.g., exceeded the predetermined threshold) and the generated image at 302 also indicates a large contact area (e.g., exceeded the predetermined threshold) an embodiment may take no action at 304.

However, if it determined that the facial contact does not exceed the predetermined threshold at 303, an embodiment may toggle a characteristic of the electronic device at 305. The characteristic may be any modifiable characteristic of an electronic device. For example, muting/unmuting the microphone, enabling/disabling the display, muting/unmuting the speaker, enabling/disabling a connection type, displaying an option to mute or unmute the microphone, etc.

In one embodiment, the predetermined threshold may only have relevance based on a known detected facial contact. For example, if a user is only in contact with a small percent of the touch surface, the threshold for a trigger event may be a much larger contact area with the touch surface. Conversely, if the user is contacting a large portion of the touch surface, the threshold for a trigger event may be detecting that the user is touching a much smaller portion of the touch surface.

In an embodiment, the predetermined threshold may be based on historical user contact. Thus, an embodiment may utilize machine learning to determine how much of a specific user's face or other body part is in contact with the touch surface of an electronic device during typical usage. Based on this learned information, an embodiment may infer the current user's intent based on the amount of contact the user has with the touch surface of the device. In an embodiment, multiple user profiles may exist to allow a device to function for multiple users, e.g., based on dynamic or real-time biometric identification that loads a particular user's profile.

In an embodiment, as discussed herein, the facial detection may be detected at regular intervals, based on a trigger, or in real-time. Thus, an embodiment may determine device proximity to a user but also may determine particular user actions (e.g., based on real time user movement). For example, the motion a user makes with their jawline while taking is very different than the motion they make when eating. Thus, an embodiment may be able to monitor the user's facial movements to determine if the user is chewing or eating instead of talking. Thus, although the user may still have a large facial contact area, an embodiment may infer that they are not engaged in the conversation because they are eating or chewing. It should be understood, that eating is a non-limiting example, and that any detectable user activity may be used as a trigger event; such as singing, yelling, laughing, coughing, drinking, etc.

An embodiment may also inform the user of the action being taking. For example, an embodiment may execute an action based on the toggling of a characteristic at 305. It should be understood, that the user notification may take place at various times, for example, before toggling the characteristic, after toggling the characteristic, or simultaneously with toggling the characteristic. Thus, an embodiment may take any notifying action based on the toggling at 305. For example, an embodiment may play an audio signal (e.g., tone or series of tones), enable some form of haptic feedback (e.g., vibrate), or give some visual indication (e.g., flashing the LED or screen).

Accordingly, as illustrated by the example embodiments and figures, an embodiment provides a technical improvement to an electronic device to improve user interaction. An embodiment may detect, using a touch surface, some amount of facial contact of a user with an electronic device. Based on this contact, an embodiment may determine a position of the electronic device relative to user or user's face. Knowing the general position of the device, an embodiment can infer a user's intent and thus toggle, based on the identified position, a characteristic of the electronic device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, using a touch surface of an electronic device, facial contact of a user with the touch surface;
   identifying, using a processor, a percentage of the touch surface associated with the facial contact;
   determining, using a processor, that a position of the electronic device making facial contact does not exceed a predetermined threshold of contact with the touch surface, wherein the predetermined threshold of contact is dynamically adjusted based on the percentage of the user's face in contact with the electronic device and historical user facial contact with the electronic device;
   toggling at least one characteristic of the electronic device, wherein the at least one characteristic is associated with a microphone of the electronic device; and
   executing an action, based on the toggling of the characteristic, to notify the user of the toggling.

2. The method of claim 1, wherein the at least one characteristic comprises at least one of: muting a microphone of the electronic device, un-muting of a microphone, enabling a display device, disabling a display device, muting a speaker, unmuting a speaker, enabling a connection type, disabling a connection type.

3. The method of claim 1, wherein the determining is further based on identifying, based on the detected facial contact, at least one of: a user ear and a user cheek.

4. The method of claim 3, wherein the identifying further comprises detecting that the user ear contact exceeds a predetermined threshold.

5. The method of claim 3, wherein the identifying further comprises detecting that the user cheek contact exceeds a predetermined threshold.

6. The method of claim 1, wherein the action comprises: an audio signal, a form of haptic feedback, and a visual indicator.

7. The method of claim 1, further comprising:
   detecting, using the touch surface, facial contact of a user with an electronic device at regular intervals; and
   determining, based on the facial contact of the user, a current user action, wherein the toggling is further based on the current user action.

8. The method of claim 7, wherein the user action is at least one of: talking, chewing, laughing, coughing, drinking, yelling, and singing.

9. The method of claim 1, wherein the determining comprises generating an image at predetermined intervals during a duration of a communication.

10. An information handling device, comprising:
    a touch surface;
    a processor;
    a memory device that stores instructions executable by the processor to:
    detect, using the touch surface of an electronic device, facial contact of a user with the touch surface;
    identify, using a processor, a percentage of the touch surface associated with the facial contact;

determine that a position of the electronic device making the facial contact does not exceed a predetermined threshold of contact with the touch surface, wherein the predetermined threshold of contact is dynamically adjusted based on the percentage of the user's face in contact with the electronic device and historical user facial contact with the electronic device;

toggle at least one characteristic of the electronic device, wherein the at least one characteristic is associated with a microphone of the electronic device; and execute an action, based on the toggling of the characteristic, to notify the user of the toggling.

11. The information handling device of claim 10, wherein the at least one characteristic comprises at least one of: muting a microphone of the electronic device, un-muting of a microphone, enabling a display device, disabling a display device, muting a speaker, unmuting a speaker, enabling a connection type, disabling a connection type.

12. The information handling device of claim 10, wherein to determine that the position of the electronic device making the facial contact is further based on identifying, based on the detected facial contact, at least one of: a user ear and a user cheek.

13. The information handling device of claim 12, wherein the identifying further comprises detecting that at least one of: the user ear contact exceeds a predetermined threshold and the user cheek contact exceeds a predetermined threshold.

14. The information handling device of claim 10, wherein the instructions further executable by the processor to execute an action, based on the toggling of the characteristic, to notify the user of the toggling.

15. The information handling device of claim 14, wherein the action comprises: an audio signal, a form of haptic feedback, and a visual indicator.

16. The information handling device of claim 10, wherein the instructions are further executable by the processor to:
    detect, using the touch surface, facial contact of a user with an electronic device at regular intervals; and
    determine, based on the facial contact of the user, a current user action, wherein the toggling is further based on the current user action.

17. The information handling device of claim 16, wherein the user action is at least one of: talking, chewing, laughing, coughing, drinking, yelling, and singing.

18. The information handling device of claim 10, wherein to determine that the position of the electronic device making facial contact comprises to generate an image at predetermined intervals during a duration of a communication.

19. A product, comprising:
    a storage device having code stored therewith, the code being executable by a processor and comprising:
    code that detects, using a touch surface of an electronic device, facial contact of a user with the touch surface;
    code that identifies, using a processor, a percentage of the touch surface associated with the facial contact;
    code that determines that the facial contact does not exceed a predetermined threshold of contact with the touch surface, wherein the predetermined threshold of contact is dynamically adjusted based on the percentage of the user's face in contact with the electronic device and historical user facial contact with the electronic device;
    code that toggles at least one characteristic of the electronic device wherein, the at least one characteristic is associated with a microphone of the electronic device; and
    code that executes an action, based on the toggling of the characteristic, to notify the user of the toggling.

* * * * *